United States Patent
Barraclough et al.

(10) Patent No.: US 9,807,095 B2
(45) Date of Patent: *Oct. 31, 2017

(54) REMOTE ACCESS TO SHARED MEDIA

(71) Applicant: Nokia Technologies Oy, Espoo (FI)

(72) Inventors: Keith Barraclough, Mountain View, CA (US); David Irvine, San Jose, CA (US)

(73) Assignee: Nokia Technologies Oy, Espoo (FI)

( * ) Notice: Subject to any disclaimer, the term of this patent is extended or adjusted under 35 U.S.C. 154(b) by 0 days.

This patent is subject to a terminal disclaimer.

(21) Appl. No.: 14/854,546

(22) Filed: Sep. 15, 2015

(65) Prior Publication Data
US 2016/0006737 A1  Jan. 7, 2016

Related U.S. Application Data

(63) Continuation of application No. 11/852,886, filed on Sep. 10, 2007, now Pat. No. 9,143,818.
(Continued)

(51) Int. Cl.
*G06F 7/04* (2006.01)
*G06F 17/30* (2006.01)
(Continued)

(52) U.S. Cl.
CPC .............. *H04L 63/10* (2013.01); *H04L 65/60* (2013.01); *H04N 21/2343* (2013.01);
(Continued)

(58) Field of Classification Search
CPC ........ G11B 20/00086; G11B 20/00731; G11B 20/00855–20/00869; H04L 2209/60;
(Continued)

(56) References Cited

U.S. PATENT DOCUMENTS 4,979,118 A   12/1990   Kheradpir
5,774,660 A   6/1998    Brendel et al.
(Continued)

OTHER PUBLICATIONS

Hammer, "GPS to do wonders for wireless browsing", Web Post, May 25, 2000, retrieved on Oct. 19, 2015 from http://www.breadoflifebiblestudy.com/Lessons/20Prophecy&End-Times/Articles/MarkOfBeast20.pdf, 2 Pages.
(Continued)

*Primary Examiner* — Daniel Potratz
(74) *Attorney, Agent, or Firm* — Ditthavong & Steiner, P.C.

(57) ABSTRACT

Remote media access is facilitated. According to an example embodiment, remote-user media access is facilitated using media provided by a subscriber media source, over a packet-based network. This access is facilitated in an environment involving subscriber users that provide media for transfer over a packet-based network to a remote device. A host server receives a request for access to media content provided by a subscriber. The request is authorized as a function of authorization criteria. In response to the request being authorized, a media source associated with the subscriber is controlled to provide requested media for access at a remote device. A media player is displayed at the remote device, and the media is provided for access via the media player.

18 Claims, 3 Drawing Sheets

Related U.S. Application Data

(60) Provisional application No. 60/843,628, filed on Sep. 11, 2006.

(51) Int. Cl.
| | |
|---|---|
| *H04N 7/16* | (2011.01) |
| *H04L 29/06* | (2006.01) |
| *H04N 21/274* | (2011.01) |
| *H04N 21/2743* | (2011.01) |
| *H04N 21/2343* | (2011.01) |
| *H04N 21/254* | (2011.01) |
| *H04N 21/81* | (2011.01) |
| *H04N 21/858* | (2011.01) |
| *H04N 21/47* | (2011.01) |
| *G11B 20/00* | (2006.01) |

(52) U.S. Cl.
CPC ....... *H04N 21/2541* (2013.01); *H04N 21/274* (2013.01); *H04N 21/2743* (2013.01); *H04N 21/8193* (2013.01); *H04N 21/8586* (2013.01); *G11B 20/00731* (2013.01); *G11B 20/00855* (2013.01); *H04L 2209/60* (2013.01); *H04N 21/47* (2013.01)

(58) Field of Classification Search
CPC ......... H04L 2209/603; H04L 2209/605; H04L 41/509; H04L 65/60; H04L 2463/101; H04N 21/27–21/2747
See application file for complete search history.

(56) References Cited

U.S. PATENT DOCUMENTS

| | | | |
|---|---|---|---|
| 5,862,325 A | 1/1999 | Reed et al. | |
| 5,920,701 A | 7/1999 | Miller et al. | |
| 5,996,022 A | 11/1999 | Krueger et al. | |
| 6,006,264 A | 12/1999 | Colby et al. | |
| 6,067,565 A | 5/2000 | Horvitz | |
| 6,112,225 A | 8/2000 | Kraft et al. | |
| 6,161,133 A | 12/2000 | Kikinis | |
| 6,167,438 A | 12/2000 | Yates et al. | |
| 6,308,209 B1 | 10/2001 | Lecheler | |
| 6,308,222 B1 | 10/2001 | Krueger et al. | |
| 6,493,758 B1 | 12/2002 | McLain | |
| 6,577,601 B1 | 6/2003 | Wolpert | |
| 6,678,244 B1 | 1/2004 | Appanna et al. | |
| 6,697,333 B1 | 2/2004 | Bawa et al. | |
| 6,751,664 B1 | 6/2004 | Kogan et al. | |
| 6,871,236 B2 | 3/2005 | Fishman et al. | |
| 6,888,477 B2 | 5/2005 | Lai et al. | |
| 6,937,168 B2 | 8/2005 | Rao et al. | |
| 7,120,702 B2 | 10/2006 | Huang et al. | |
| 7,139,834 B1 | 11/2006 | Albanese et al. | |
| 7,913,095 B2 | 3/2011 | Raley et al. | |
| 8,601,572 B2 | 12/2013 | King et al. | |
| 2002/0174246 A1 | 11/2002 | Tanay et al. | |
| 2003/0061387 A1 | 3/2003 | Brown et al. | |
| 2003/0110234 A1 | 6/2003 | Egli et al. | |
| 2003/0126088 A1 | 7/2003 | Mineyama | |
| 2003/0177269 A1 | 9/2003 | Robinson et al. | |
| 2003/0200337 A1 | 10/2003 | Jabri et al. | |
| 2004/0003132 A1 | 1/2004 | Stanley et al. | |
| 2004/0139233 A1 | 7/2004 | Kellerman et al. | |
| 2004/0250291 A1 | 12/2004 | Rao et al. | |
| 2004/0267954 A1 | 12/2004 | Shen | |
| 2005/0033850 A1 | 2/2005 | Kirkland | |
| 2005/0132264 A1 | 6/2005 | Joshi et al. | |
| 2006/0167985 A1* | 7/2006 | Albanese | H04L 63/08 709/203 |
| 2006/0173974 A1 | 8/2006 | Tang | |
| 2006/0195902 A1* | 8/2006 | King | G06F 17/30766 726/21 |
| 2007/0154170 A1* | 7/2007 | Monroe | H04N 5/775 386/297 |
| 2007/0250911 A1 | 10/2007 | Nimon et al. | |
| 2008/0007651 A1* | 1/2008 | Bennett | H04N 7/162 348/443 |
| 2008/0098446 A1* | 4/2008 | Seckin | H04L 12/185 725/114 |

OTHER PUBLICATIONS

"BackWeb Foundation 5.5 Technical White Paper", Nov. 1999.

* cited by examiner

REMOTE ACCESS TO SHARED MEDIA

CROSS REFERENCE TO RELATED APPLICATIONS

This application is a continuation of and claims the right to the benefit of priority under 35 U.S.C. §120 to U.S. patent application Ser. No. 11/852,886, filed Sep. 10, 2007, titled: "REMOTE ACCESS TO SHARED MEDIA," which claims the right to the benefit of priority under 35 U.S.C. §119(e) to U.S. Provisional Application Ser. No. 60/843,628 filed on Sep. 11, 2006, titled: "REMOTE ACCESS TO SHARED MEDIA," the entire disclosure of each of which is hereby incorporated by reference in their entireties for all purposes.

FIELD OF THE INVENTION

The present invention relates generally to remote data access and, more particularly, to remote access to and playback of shared media over a packet-based network.

BACKGROUND OF THE INVENTION

Data communications over a variety of networks, such as Internet protocol (IP) networks, mobile telephone networks and others have increased at an astonishing rate over recent years. The affordability and availability of computers, telephones, wireless devices and other network access appliances has made their use prevalent in a variety of applications. Further, as the demand for network access devices has increased, the diversity in types of network access appliances has also increased, with different devices often implementing different protocols and performance-based operational characteristics.

As access to the Internet and other communications networks becomes easier, convenient and more readily available, these networks are increasingly used for transferring data such as images, audio, email, video and text. In many applications, such data is desirably transferred or shared from a user's computer (or other network access appliance) on a selective basis for remote access by the user or to share with other users. For example, data for computer software, music, video, news services, games and other applications is often desirably shared and/or accessed remotely via the Internet and, for many applications, via wireless networks such as those implemented for mobile telephones, computers and other hand-held devices. Today, the number of network subscribers, data providers, and requests by those subscribers for data transfer, streaming data and other content are growing exponentially. In many such applications, access to data or other content by users owning or subscribing to the data is desirably flexible and controllable by such users. However, the limitations of current systems restrict the ability to meet demands for flexible, controllable access to media content or other data in a reliable, secure, efficient and affordable manner.

Content (e.g., audio, images or video) has evolved in application and is readily stored electronically. For example, the storage of music in rewritable electronic media has become a popular method in which to maintain and access music collections. Another example involves video applications, where digital recording and storage of television and personal video collections has become popular, as has the streaming (via the Internet) of audio and video. Photos are often stored and accessed electronically, instead of relying upon conventional printed photos and physical photo albums.

As the electronic storage of content and other data grows in popularity, access to the data, as well as convenient manners in which to store the data, have become increasingly important. For example, sales of music in downloadable audio formats are becoming increasingly popular. Digital audio players based in the home or office or mobile players that can be used in autos, laptop computers, personal listening devices and others are used for playback of this downloaded music. In order to play the music, audio data is loaded onto mobile players or local computers and used to locally play the music. Typically, the amount of storage space required for storing a large volume of audio data exceeds the memory capacity of digital audio players, computers or other appliances capable of playing music. In this regard, the management and use of audio, as well as other data such as image data and video data, has become increasingly burdensome in view of the demand for and use of this data.

Another challenge to data transfer and management stems from the existence of a myriad of different types of data, as well as different types of data access appliances. For example, a variety of different data types are implemented for storing audio files. Often, these data types are associated with a particular type of digital audio device that is being used for playback. In addition, with each data type, there are often different manners in which the data is stored, typically involving different levels of quality (e.g., with different playback bitrates). In this regard, a digital audio player must not only have access to data but also have access to data in a particular format.

Still another challenge to network data transfer involves the management of media rights associated with digital rights management (DRM). As discussed above, digital media such as audio or video can be purchased via electronic delivery. In order to inhibit and/or prevent copying, distribution or other unauthorized use of data, security precautions are taken. In some applications, these security precautions require specific approaches to enable playback, which can further exacerbate difficulties associated with data transfer and subsequent use (e.g., playback).

Effectively and efficiently managing shared media transfer via communication networks has been challenging in the face of the advancement of technologies and trade channels that use or could use network-based data transfer.

SUMMARY

The present invention is directed to approaches to media sharing and routing, and associated applications for providing media to a remote device. The present invention is exemplified in a number of implementations and applications, some of which are summarized below.

According to an example embodiment of the present invention, media such as a playlist, album or track is shared with another through a remote user interface. A host server facilitates access to a subscriber's media, by a remote user at a remote device, by interacting with the subscriber's media source and controlling the delivery of media from the media source, over a packet-based network, to the remote user. In some applications, the host server and/or the media source transcode media for use at the remote device, in accordance with one or more of: capabilities of the remote device, a subscription level of the remote user and/or of a subscriber providing media for access, and available communications for delivering media to the remote device.

In another example embodiment, a host server facilitates remote display and interaction with a third-party music library. This approach may be implemented, for example, using an approach as described above, involving access to subscriber media.

According to another example embodiment of the present invention, a network storage device, such as a cache, is populated in accordance with subscriber media selections. In some implementations, a host server interacts with a subscriber's media source, at the direction of the subscriber, for providing media from the media source to the network storage. The host server facilitates subsequent remote access to the network storage, by controlling the deliver of the media from the network storage to a remote device from which access is requested.

According to another example embodiment of the present invention, media is shared by way of a uniform resource locator (URL) that is presented to a remote user for share access. The remote user can then use the URL to access shared media. In some applications, the URL includes embedded information that facilitates the share. In addition, as may be relevant to the above examples, some applications are directed to the implementation of the URL by a host server that provides a web page in response to the URL being activated, and facilitates remote user access to the web page via the web page.

The above summary is not intended to describe each embodiment or every implementation of the present invention. The figures and detailed description that follow more particularly exemplify these embodiments.

BRIEF DESCRIPTION OF THE DRAWINGS

The invention may be more completely understood in consideration of the detailed description of various embodiments of the invention that follows in connection with the accompanying drawings, in which.

Figure 1:
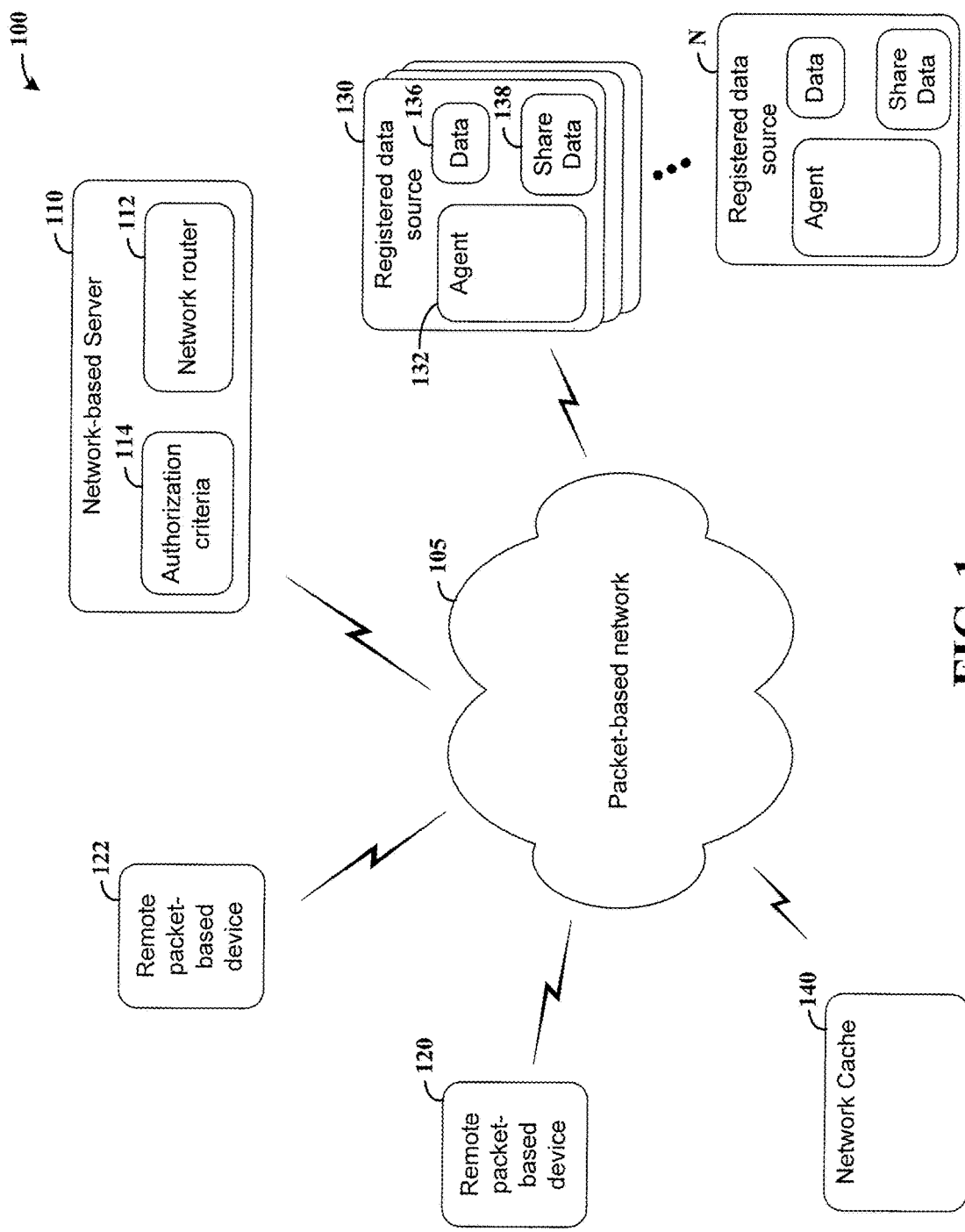
FIG. 1 is a system for sharing and routing media via a packet-based network, according to an example embodiment of the present invention.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention as defined by the appended claims.

DETAILED DESCRIPTION

The present invention is believed to be applicable to a variety of different types of communications, and the invention has been found to be particularly suited for providing remote access to user media via a packet-based network such as the Internet. While the present invention is not necessarily limited to such applications, various aspects of the invention may be appreciated through a discussion of various examples using this context.

According to an example embodiment of the present invention, media content such as audio, video or images is provided for remote access. A host server communicates over a packet-based network to facilitate the communication of media from media sources to remote devices. The media sources, such as a registered user's packet-based device or a network-based cache, are programmed to respond to the host server by providing media for communication to a remote device. The host server authenticates remote users requesting media access from a remote device, and facilitates the presentation of an interface to the remote devices for use in accessing media shared from the media sources.

In another embodiment, an interface is presented to a user at a media source for use in establishing a share (i.e., a set of media content that the user wishes to make available to a remote device). In some applications, the interface is presented by the host server, and in other applications, an application at the media source. Once the share is established, the share can be accessed remotely in accordance with any authentication or other characteristics of the share (e.g., as identified by the user creating the share and/or in accordance with rights associated with the shared media). The host server responds to remote user requests to access the share by authenticating the user and, for authenticated users, facilitating access to the share, or to a portion of the share requested by the remote user.

FIG. 1 is a system 100 for sharing and routing media via a packet-based network, according to an example embodiment of the present invention. The system 100 includes a network-based server 110, a plurality of remote packet-based devices, including devices 120 and 122, a plurality of registered data sources 130-N and a network cache 140, all of which communicate via a packet-based network 105. The remote packet-based devices include, for example, a mobile telephone, a personal computer (PC), a digital media device such as an mp3 player or video player, an automobile entertainment system or a personal data assistant (PDA) device. Such devices may also be implemented as the registered data sources 130-N, and generally facilitate access to registered-user data at a remote packet-based device either directly or via the network cache 140.

The network-based server 110 provides access to data, such as media provided via the registered data sources 130-N, to remote packet-based devices using, for example, an interface presented to a remote packet-based device. Registered users set preferences relating to data to be provided to remote packet-based devices, and the network-based server 110 provides access to the data in accordance with these preferences. In one implementation, a registered user wishes to provide remote access to a playlist or other media file and sets such preferences; the network-based server 110 responds to a remote-user request to access the playlist or other media file by providing a media player (e.g., via a web page) to the remote user for playback of the requested media.

The network 105 includes one or more packet-based networks such as the Internet and, where appropriate, other networks such as a mobile telephone network or a local area network (LAN). In some applications, the network 105 is a local area network implemented for a locality such as a home or business. In other applications, the network 105 is or includes a virtual network or set of virtual application communication channels within a processor or group of processors associated with a computing appliance.

The network cache 140 also has access to the packet-based network 105 for communication with the network-based server 110. While shown as a single item in FIG. 1, the network cache 140 may be implemented with a plurality of devices, at one or more of a plurality of locations. For example, some or all of the network cache 140 may be located at the network-based server 110 or at the registered data source 130.

Each of the registered data sources 130-N includes an agent (see agent 132 of registered data source 130) that facilitates communication between the registered data source and the network-based server 110, and directs the routing of share data 138 such as media from the registered data source over the packet-based network 105.

The network-based server 110 includes a network router 112 that communicates with the registered data sources 130-N for directing the routing of data therefrom. The network-based server 110 selectively directs or otherwise controls the sharing of data, directly from the data source and/or from a network cache 140 (with shared data pushed to the network cache 140 in the latter instance). The network-based server 110 also uses authorization criteria 114 to facilitate remote access by remote packet-based devices to registered user data at the registered data sources 130-N and at the network cache 140. The authorization criteria 114 also includes authorization information for registered users and uses the authorization, for example, in specifying registered user preferences for accessing data, caching data or other data-transfer-related functions.

The share data 138 is selectively stored at various locations, depending upon the application. In one instance, all share data is stored with the server 110. In another instance, all share data relative to a particular registered user is stored with the share data 138 (referring to registered data source 130 by way of example), with the network-based server accessing the share data remotely, if appropriate. In still another instance, the share data is stored in another remote location accessible by the network-based server 110 and/or the registered data sources 130-N.

In some applications, the network router 112 and the agent 132 (using registered data source 130 by way of example) facilitate communications between each other as follows. When the registered data source 130 powers up, connects to the packet-based network 105 or endures another condition (where no current communications link is established with the network-based server 110), it automatically initiates contact with the network-based server. The network-based server then responds to the contact by authenticating the registered data source 130 via authorization criteria 114, and uses the information in the initiating contact to communicate back to the registered data source 130 over the packet-based network 105, therein establishing a communications link. This communications link is then kept active and used for the passing of control information from the network router 112 for controlling the passing of data from the registered data source 130.

The network cache 140 is used in one or more of a variety of manners. Using registered data source 130 by way of example, caching rules, such as those specifying what portions of the data 136 to send to the network cache 140 or what format or bitrate to use for the data sent to the cache, are used in populating the cache. The network-based server 110 also selectively controls the network cache 140 for functions such as associating data in the cache in accordance with playlists, or for deleting data in the cache. For instance, where data in the cache has a specified lifetime, or where data in the cache is to be deleted after it is accessed (discussed further below), the network-based server 110 deletes data when such conditions are met.

In some implementations, registered users purchase space in the network cache 140; the network-based server 110 tracks information relative to the purchased space and manages the storage of the registered user's data in the network cache. For instance, where a user purchases and pays for time-limited usage of the network cache 140, the network-based server 110 selectively deletes the registered user's data from the network cache 140 upon expiration of such time (or, e.g., when payment for the usage is not received).

In some applications, the network-based server 110 suspends registered user accounts that are unpaid or otherwise non-current without necessarily immediately deleting data in the network cache 140. The network-based server 110 notifies or otherwise controls the network cache 140 to make data for suspended accounts inaccessible until the account is reinstated. In some applications, this approach involves the denial of requests for data in the network cache 140 received at the network-based server. In other applications, this approach involves setting criteria at the network cache 140 such that the network cache itself limits or prevents access to data.

In another embodiment, the system 100 facilitates electronic token-based access to registered data as follows. When a user at registered data source 130 wishes to share particular data with another user (or remotely access the data himself or herself), the registered user directs the creation of an electronic token that specifies information that can be used to identify the data to which access is to be provided. The data that is the subject of the token is pushed to the network cache 140 and the electronic token is provided for access by a remote user (e.g., as a URL). When such a remote user implements the token (e.g., by providing the token with authorization information to the network-based server 110, such as by clicking on a URL), the network-based server responds by directing appropriate data from the network cache 140 to the requesting remote user. Once the data specified in the token has been accessed remotely (e.g., and downloaded), the data is selectively removed from the network cache 140. In some applications, data specified in the token is pushed to the network cache 140 at the direction of the registered user directing the creation of the token. In other applications, the network-based server directs the pushing of the data to the network cache when information regarding the electronic token is received thereat. For general information regarding data transfer, and for specific information regarding token-based data transfer applications that may be implemented in connection with these and other example embodiments, reference may be made to U.S. patent application Ser. No. 11/374,414, entitled "Token-based Remote Data Access" and filed on Mar. 13, 2006, which is fully incorporated herein by reference.

The system 100 is adapted to work in a variety of environments involving disparate networks, data source devices, remote packet-communicating devices, data and characteristics thereof. One particular use scenario involves remote data access as follows. When a particular user who is party to the registered data source 130 (e.g., a homeowner having media content stored at his or her home computer) wishes to establish remote access to data, the user signs up for a service provided via the network-based server 110. The network-based server 110 prompts the user for access information to the user's registered data source 130 so that the host application router 112 can interact with the registered data source. This access information (e.g., user names, passwords, access restrictions) is stored with authorization criteria 114.

Once registered, the registered data source 130 makes data 136 available either via the registered data source itself or at the network cache 140 by pushing data to the network cache. In some applications, data for a particular user is made available only via the network cache 140 (i.e., such that the network router 112 does not control or otherwise facilitate the routing of data from the registered data source 130 to remote devices). Once data is made available either directly via the registered data source 130 and/or via the network cache 140, a user at one of the remote packet-based devices 120 or 122 can request and receive data from the registered data source 130 with appropriate authorization and data transfer control, also as discussed above.

Data is transferred via the system 100 in one or more of a variety of manners. The following example approach involves remote user access to data originating at a registered-user's data source, with at least a portion of the data cached. For illustration, this example is discussed in the context of a remote user at the remote packet-based device 120 accessing data originating at registered data source 130, with a portion of the data 136 stored at the network cache 140.

The network-based server 110 hosts a web page accessible by the remote packet-based device 120. The remote user accesses the hosted web page at the remote packet-based device 120 and enters in authorization information that is presented to the network-based server 110. In response, the network-based server uses the authorization criteria 114 with the provided authorization information to either authorize or deny the user access to data originating from the registered data source 130. In some applications, this authorization is selective based upon the type of data requested by the user.

Once authorized, a data request initiated by the user at the remote packet-based device 120 is processed by the network-based server 110, and a media player or other application that can be used to access the requested data is launched at the remote packet-based device. Such a media player may, for example, be provided by the network-based server 110 as a web-based player. If some or all of the requested data is available at the network cache 140, the network-based server selectively provides access to data in the network cache 140 to the remote packet-based device 140. For instance, when requested media is available at the network cache 140 and the registered data source 130 is offline or otherwise incapable of delivering the data, the network-based server 110 directs playback of media from the network cache 140. Such playback may, for example, limit access to the media for playback only (e.g., where the media is a music track, access to the track is provided via a media player, yet the entire audio file for the track is not necessarily provided). Similarly, where the registered user (of the registered data source 130) specifies that certain data be routed from the network cache 140, such an approach is implemented to serve the request.

In some applications where data is available for transfer from the network cache 140 as well as from the registered data source 130, the network-based server 120 selects a source from which to transfer data to satisfy the request. For instance, transfer from one of the network cache 140 and the registered data source 130 may be faster, exhibit higher quality or be less expensive than transfer from the other one of the network cache and the registered data source.

Data transfer to the remote packet-based device 120 from one or both of the network cache 140 and the registered data source 130 is effected in different manners, depending upon the application, available equipment, characteristics of the remote packet-based device or other condition. In some applications, data is routed through the network-based server 110 and passed to the remote packet-based devices 120 and 122. In other applications, data is routed directly from one or both of the registered data source 130 and the network cache to the remote packet-based device 120 (via the packet-based network 105), without necessarily passing the data through the network-based server 110.

In addition to different routing options for data transfer as discussed above, a variety of approaches are implemented for presenting data in an appropriate format and/or bitrate. For instance, data routed to the remote packet-based devices may be transcoded into a particular format or bitrate amenable to implementation with capabilities of the remote devices. In some applications, the quality (e.g., bitrate) of data provided for access at a remote packet-based device is set in accordance with a subscription level of a user at one or both of the remote packet-based device receiving the data or a registered data source providing the data. Example subscription levels as may be implemented in connection with FIG. 1 and one or more example embodiments may be implemented in a manner not inconsistent with the approaches described with Appendix C (e.g., at Section 5) in the underlying provisional application, which is incorporated herein by reference and also filed with this patent document for convenience.

In another example, embodiment, and referring to FIG. 1, the network-based server 110 assesses a fee for providing data routing. Such fees are assessed to registered users providing data, to remote users accessing data, or to other users, such as a third-party data provider making data available via the network-based server 110. In some applications, the network-based server 110 provides advertising in connection with the transfer of data, with the advertising provided at one or both of remote packet-based devices and registered data sources. The network-based server 110 assesses fees for the advertising.

For other example embodiments and approaches to the delivery of data (e.g., media), as described in connection with FIG. 1 above and/or with the figures below, reference may be made to U.S. Pat. No. 7,139,834 issued on Nov. 21, 2006 and entitled "Data Routing Monitoring and Management," and to U.S. patent application Ser. No. 11/056,345 filed on Feb. 11, 2005 and entitled "Network-Distributed Data Routing;" both patent documents are fully incorporated herein by reference.

Figure 2:
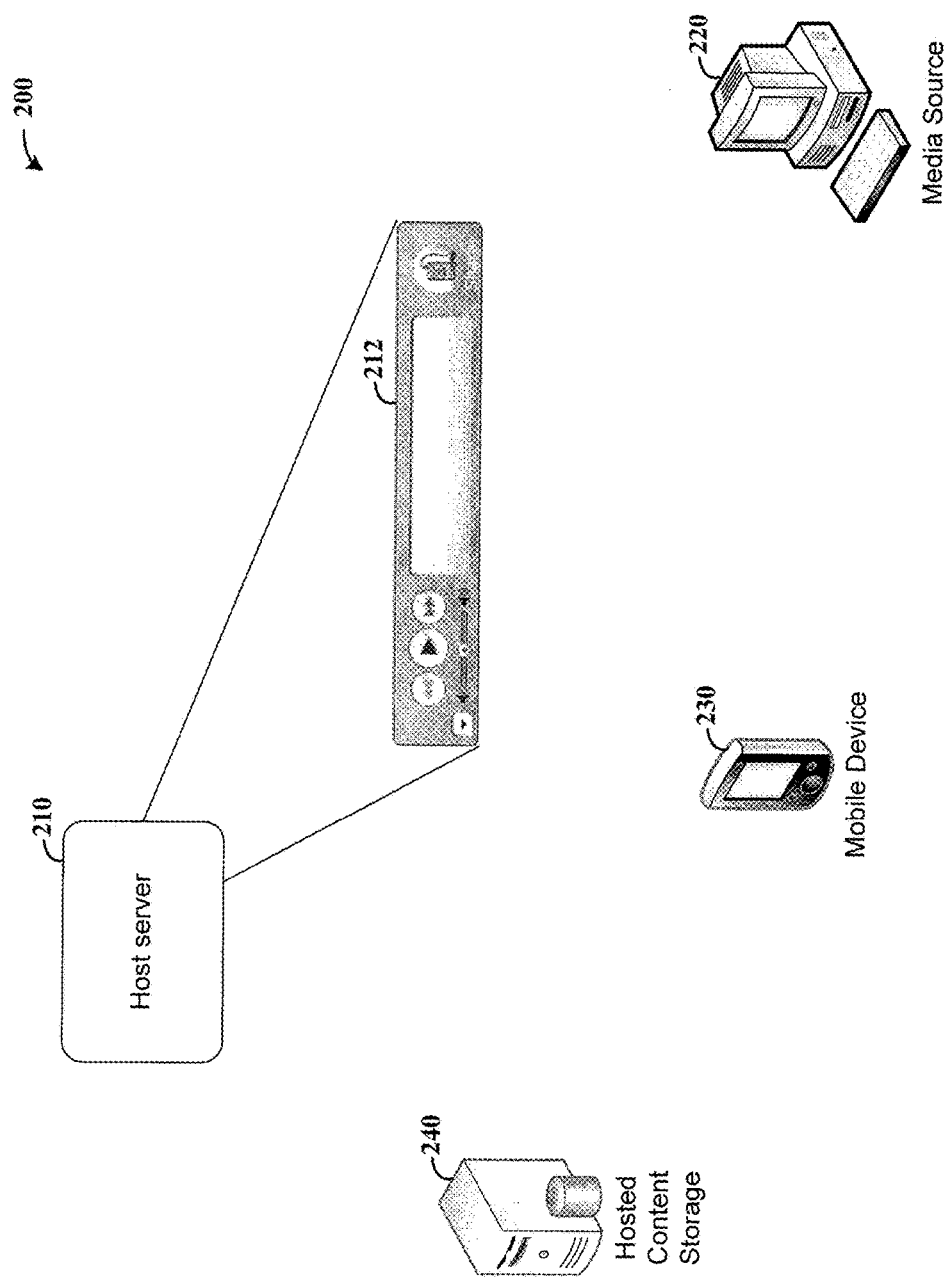
FIG. 2 shows remote user interface-type approach for use in connection with another example embodiment of the present invention.

FIG. 2 shows remote user interface-type approach 200 for sharing media content in connection with another example embodiment of the present invention. A host server 210 provides a user interface accessible by users at a media source 220 and at a mobile device 230. The user interface facilitates the selection of media from the media source 220 for sharing, and the playback of the shared media. The interface is presented in one or more of a variety of manners, with a mini-player 212 shown as one example type of interface (or a portion thereof). Other players that are implemented in connection with various example embodiments that are not inconsistent with the examples shown and described in Appendix C as referenced above. In some applications, the interface is web-based, presented via a web page provided via the host server 210. In other applications, at least a portion of the interface involving a player such as the mini player 212 or a more complex player is implemented with software at a packet-based device accessing a share; in such applications, the software interacts with the host server 210 for accessing media.

Using the interface, a user can select media to share from one or both of the media source 220 and a hosted content storage 240, where the user may selectively store media content for sharing or remote access. Once media is selected to share, a remote user at a mobile device 230 can access the user interface to access (e.g., play back) shared media, via the host server 210. With these approaches, share access to media such as a playlist having one or more media items is made possible to a remote user interface. Such media may include, for example, a music album, video movie, music track or video clip.

The approach shown in FIG. 2 is applicable for implementation with a variety of media sources, hosted content storage devices, mobile devices or other remote devices such as a personal computer for accessing a share. That is, with certain embodiments, the host server 210 presents an interface such as the mini-player 212 to a multitude of users, such as described above in connection with FIG. 1, for the creation and implementation of a variety of user-specific shares. Various other aspects of the embodiments described with FIG. 1 are accordingly implemented with the approach shown in FIG. 2 for a variety of purposes such as media transfer, user registration, data transfer tracking, rights management and payment.

As discussed above, a variety of user interface approaches are implemented for different applications. In one embodiment, the type of interface presented to users creating or accessing a share is implemented in accordance with a subscription level of the user and, in some applications, in accordance with the access type (i.e., share creation or remote share access). In one implementation, when a user is establishing a share with his or her media source, the host server 210 provides an interface bearing share options. When a remote user accesses such a created share, the host server 210 provides an interface that facilitates share access but that may or may not include any share options. In another implementation, an enhanced interface is presented to subscribing users (i.e., users subscribed to a free or fee-based share service), with a basic interface presented to other users, such as remote (unsubscribed) users accessing a share. Features on such an enhanced player may include, for example, delivery format and/or method such as bandwidth and delivery medium, playback features such as those relating to level and frequency, and security features such as those limiting access to the shared media.

When a remote user at a mobile device 230 (or at any remote packet-based device) accesses a share, the host server 210 communicates with the media source 220 to direct the media source to provide media in the share to which access has been requested. Generally, the media source 220 responds to the host server to provide the media to the host server 210, or to another network-based device controlled by the host server 210, which in turn routes the media to the mobile device 230. In certain applications, the media source responds to the host server 210 to provide the media directly to the mobile device 230 over a packet-based network.

A variety of approaches are implemented in the creation of, and subsequent access to, a share to suit various example embodiments. In one application, a share button is presented via the interface and, when selected, causes a dialog to be presented. The dialog facilitates the selection of one or more share recipients, and the content of the share. For instance, a user can establish a share that includes an entire current collection (e.g., playlist), a currently-selected track or video, a predefined set of media, or media falling under a certain category such as media type, author, composer or volume. Any request to share audio content is sent to the host server 210, with the request identifying sender (user creating the share), the recipient (e.g., via telephone or email addresses), and the content that is being shared. In certain applications, the share also includes security information, such as a user name and/or password required to access the share. The host server 210 then makes this share available to the recipient in response to a request to access the share by the recipient. In some applications, the host server 210 contacts the indicated recipient to inform the recipient that the share is available.

In one implementation, the media source 220 is a user's personal computer, with audio media (e.g., music) stored at or otherwise accessible to the personal computer shared at the user's discretion. In another implementation, the media source 220 is a mobile device implementing a share from the mobile device, for media at or otherwise accessible to the mobile device using, for example, an approach similar to that discussed in connection with various approaches in Appendix C as referenced above, relevant to sharing. In these implementations, the media source 220 communicates with the host server 210 to allow the host server to control access to media at the media source 220. For instance, referring to FIG. 1 and the discussion above, an application router programmed at the media source 220 similar to the agent 132 can be implemented to facilitate this access. In some applications, such an application router communicates with the host server 210 when the media source 220 is connected to a network such as the Internet to initiate communications with the host server, which in turn can then provide share access to content at the media source as requested by a mobile device 230.

In connection with another example embodiment of the present invention, a subscription service facilitates access to a media set that belongs to a registered user and/or to a third party provider to which a user is subscribed. Such a media set may be implemented, for example, as an asset space that is identified as a set of assets (e.g., audio, video or images) that belong to a particular asset space, with the individual assets stored in one or more locations. In addition, where a registered user subscribes to a third-party media service, a the user may select media to share from the third-party media source subscription, with the share being accessed remotely by the subscribing user or another user in a manner consistent with the subscription and/or any rights associated with the media.

In some applications, a user interface, such as that presented via the host server 210 in FIG. 2, presents a media set oriented around collections of media grouped using one or more of a variety of approaches. For instance, where the media to be shared includes music, such collections may be associated around one or more related aspects such as user or automatically-selected playlists, albums, genre or artists, or specific files by name or location.

Once a media collection has been set, the collection is made available for browsing as part of a media asset space. In some embodiments, referring again to FIG. 2, the host server 210 presents an interface to the mobile device 230 that facilitates browsing of a media set available at the media source 220 and/or at other source locations. In this context, the media source 220 may, for example, be a third-party source such as a media provider to which subscribers are granted media access and, where appropriate, may provide access to other users on a share basis as described herein.

In one application, an interface is presented with a view that shows or otherwise allows access to a set of collections that has been pre-selected, transcoded and moved to a storage location, such as a hosted content storage 240 on a network, or at a location specified at the media source 220. In other applications, the interface is presented with a view that allows users to browse, select and play all collections and tracks that are available in a media asset space available to the user (i.e., media stored at a media source coupled to a network such as the Internet, or stored at another network location). Access to any underlying file systems at the media source (or any storage location that is part of an asset space) is controlled by the host server 210, by limiting or preventing such access as appropriate depending upon the user seeking access, settings by a user of the media source, media rights or other characteristic.

A user at the mobile device 230 can view and sort collections available to the user by track, video or image name, artist, album, genre or other categorization-type approach, with the collections sorted in a desirable format such as a hierarchical order or other order defined by a user. In some applications, metadata associated with media content is used in establishing, accessing or otherwise providing media content for sharing. The host server 210 controls remote use access to predefined media or to an entire media library, as appropriate for the particular user (e.g., relative to subscription level, user-defined access level, capabilities of the remote device 230 or other conditions).

In one embodiment, the host server 210 presents an audio player with a user interface using a pre-parsed and structured database of media content made available for share access. Such an approach may implement an application-specific database approach, such as that implemented for use with a particular type of media playback device, with the database structured at a media source or with the playback device. In some applications, a media database at a media source 220 is a read-only, and management of the media database and creation of collections involving media at the database is performed at the local media source (e.g., a local PC) using an application-specific application at the media source.

In connection with certain example embodiments, media is transcoded or otherwise processed for access at a mobile device in accordance with capabilities of the device. For instance, one application is directed to the transcoding of one or more of various media types to a single media type, such as MP3 for audio media, for delivery as a progressive download to a remote player (device). Various approaches are directed to the implementation of several levels of service that offer different codec and sound quality, depending upon user preference and/or a cost level associated with the service. One particular application is directed to the implementation of a free service to deliver a relatively low quality of media (e.g., 56 Kbps MP3 for audio as an on-demand stream from MP3, WMA and WAV media sources) from a media source. In certain applications, codecs that support MPEG-4/AAC and higher quality bit rates such as those up to and/or exceeding 192 kbps are installed at media sources and used in providing media to subscribers at remote locations.

In another example embodiment, an agent or other application at a media source supports different types of audio access. In one implementation, a file-based transcoding approach is used to deliver a collection and a media stream to a remote device using an interface, such as the mini-player 212 in FIG. 2. In another implementation, media collections are automatically transcoded to a hosted content storage (e.g., 240) in a selected format, such as MP3 format for audio. Collections may be either individually selected for transcoding, or if space allows, all collections may be transcoded. Once media has been moved to hosted storage it may be accessed and played as an MP3 progressive download.

In another example embodiment of the present invention, media from collections that have been selected and transcoded to hosted content storage (e.g., 240) is made available in low and high quality (e.g., at both a 56 kbps and a higher data rate format for audio). In some applications, the higher quality data rate is configurable; relative to audio, such formats may include one or more of a 96 kbps, 128 kbps, 160 kbps or 192 kbps rage. Such a higher data rate is delivered, for example, to packet-based devices having network connectivity and/or applications sufficient to handle the higher rate, such as a personal computer or other device operating a relatively high-function version of a media player. With such applications involving audio content, a user may select either "Standard" or "CD" quality when using a higher-functioning application, with one of quality being a default setting.

In another example embodiment, and referring again to FIG. 2, a registered user wishing to share content initiates a share via the host server 210. When a share user at a mobile device 230 (or at another remote packet-based device) wishes to access the share, that user is required to register for a service via the host server 210. Once registered, the share user can then access the share via the host server 210 as described in one or more of the example embodiments herein. In some applications, the host server 210 facilitates the share user registration for a fee, or for free, depending upon the level of share access that the share user is attempting to achieve. In one application, the host server initiates a free trial period for the share user, during which the user can access the initiated share on a limited basis (e.g., limited in time or other aspects, such as quality or interface player functionality). In some applications, the host server 210 provides a downloadable media player that includes an invitation to register for a service offered via the host server. With these and other approaches described herein, sharing is facilitated to email addresses and phone numbers associated with a user's packet-based device at multiple locations as appropriate, such as on a user's home PC and mobile device (via a mobile audio player). Such approaches are implemented using, for example, one or more of those approaches discussed in Appendix C as discussed above.

In connection with various example embodiments, the host server 210 facilitates the delivery of an audio player as a web deployed AJAX or Flash application that does not necessarily requires installation on a remote PC or feature phone or other packet-based device. When the application is first launched, a user launching the application is required to enter authentication criteria, such as a user name and password, to connect to their media collection or to a share to which the user has been granted access.

In some embodiments, the host server 210 determines the type of interface that is delivered to a remote user automatically when a request for a player is received. For instance, when a user requests a player from a PC, the host server 210 facilitates the delivery of a relatively low-function player such as the mini player 212 if the user is a basic user (i.e., at a basic or free subscription level). Such a low-function player is also used for requests to play an audio file from certain browser interfaces, such as a file and folder browser interface. Where a user requesting a player has subscribed to a higher-level package, the host server 210 delivers a higher-function interface, such as an interface having a full metadata display and sorting abilities. Where a player request is interface having a full metadata display and sorting abilities. Where a player request is received from a mobile device, the host server 210 selectively delivers a simplified interface that allows the selection of an audio collection and track yet is functional in accordance with connectivity and/or functionality of the mobile device (e.g., providing a relatively limited view of metadata).

In connection with another example embodiment of the present invention, the host server 210 provides an audio player that includes an advertising space on the player. The advertising components occupy a space that may be pre-defined or tailored to the particular packet-based device to which the player is provided, such as at a mobile device having a relatively small-display, or at a PC having a relatively large display. In certain applications, the host server 210 displays advertising on provided media players as a function of a subscription status of users implementing the player (e.g., advertising may be eliminated for subscribers).

In various applications, the host server 210 provides a media player having a menu that provides access to several additional functions, such as those relating to the player view (e.g., full or abbreviated view), media playback options, media quality or other functions.

In connection with another example embodiment, a host such as the host server 210 or the network-based server 110 integrates a media player for launch from a general data-based remote access interface. For instance, a user interface provided for remote access to a user's registered PC may include a media player launch button that launches a media player as described herein. In one implementation, a "Play" link is displayed whenever an interface view includes media content (e.g., relative to a view simply displaying files, or displaying documents or other non-media content). In another implementation, a "Play" icon and link is displayed in an outer frame area near other selections. This icon performs one of two functions depending of whether the user has subscribed to a particular subscription level; unsubscribed users are provided an up-sell page and subscribed users are provided a full media player (e.g., launched to display the user's collections).

Figure 3:
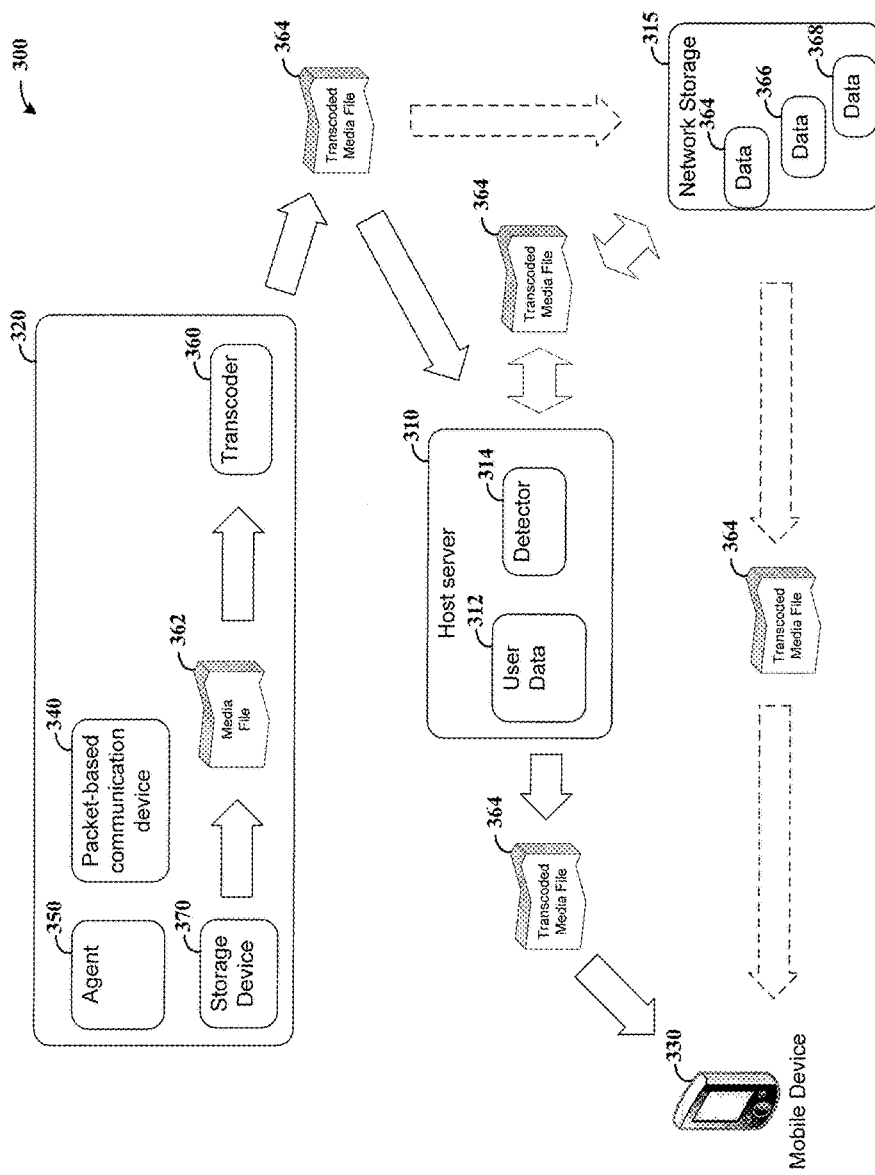
FIG. 3 shows an approach for populating storage with media and for associated access to that stored media, according to another example embodiment of the present invention.

FIG. 3 shows an arrangement 300 and approach for populating network storage 315 with media for associated access to the media, according to another example that interacts with a multitude of subscriber systems including subscriber system 320, and with a multitude of remote devices such as the mobile device 330, to facilitate subscriber media access at the remote devices. The host server 310 includes user data 312 for subscriber users and, where appropriate, guest users to whom access is given to subscriber media. The user data may include, for example, authorization criteria as discussed in other embodiments above, subscription level information, or information characterizing a mobile device (e.g., 330) via which access to media is to be made or other information useful, for example, in selecting a format or bitrate of media to be provided to a particular user. In some applications, the host server also includes a device-type detector 314 that detects characteristics of a remote device (e.g., 330) to which media is to be provided, with the host server 310 using the detected characteristics to set a format or bitrate for media to be provided to the remote device.

The subscriber system 320 includes one or more media devices such as a personal computer (PC), digital audio player, personal video recorder or media storage device; these devices are integrated, such as with a personal computer, and/or communicatively coupled with one another, such as with a home network. A packet-based communication device 340 communicates over one or more packet-based networks such as the Internet. This packet-based device 340 may include, for example, a PC or a device such as a modem, with a PC or other device implemented to communicate via the modem. An agent 350 responds to the host server 310 for providing media to the network storage 315, further facilitates the implementation of a transcoder 350 for transcoding media that is provided to the network storage in accordance with one or more of a variety of conditions. Media is stored at a storage device 370, such as a hard disc drive with a PC, networked storage, or storage with a media device such as a digital audio or video player.

The arrangement 300 is implemented for selecting a collection of audio tracks such as a media playlist or music album from a library asset space for population into the network storage 315. In this context, an asset space may be implemented as a user-defined (or otherwise defined) set of media at one or more locations associated with a particular subscribing user. Such an asset space may include media available to the subscriber system 320 and, in some instances, to other systems or devices associated with a subscriber.

Media placed in the network storage 315 is transcoded into multiple bit-rates and encoding formats to support various accessing devices and/or various subscription levels for subscribing users providing media and/or for remote users accessing the media. One approach for transcoding is exemplified with FIG. 3, with a media file 362 such as an audio track or album drawn from the storage device 370 and transcoded, via the transcoder 360, into a transcoded media file 364 having a particular format and/or bitrate. The transcoded media file 364 is then sent to the network storage 315, either directly from the subscriber system 320 or via the host server 310. The host server 310 tracks the amount of data stored at the storage 315 using actual on-disk size and/or by tracking the storage and removal of media at the network storage.

In some applications, a variety of such files are transcoded and stored at the network storage 315. For instance, in one embodiment, a common media file is transcoded into different formats and/or bitrates and stored at the network storage 315 as transcoded files 364, 366 and 368. The different transcoded files can then be used in providing media to the remote device 330, depending upon one or more characteristics such as the capabilities of the device 330, subscription level of a user at the device 330 or the subscription level of a user providing the media. These transcoding approaches are implemented, for example, using a personal computer at the subscriber system 320. With these approaches, the host server 310 can provide one of the transcoded files 364, 366 and 368 that has an appropriate format and bitrate to a remote device such as the device 330, such as determined using the user data 312 and/or the device-type detector 314, or otherwise specified.

As discussed above, the transcoding and storage of media is managed in accordance with a subscription level of users, in connection with various example embodiments. The following describes one or more such approaches. For a basic user, media content is transcoded and delivered on-the-fly from a PC at a subscriber system 320. For subscribers, media content is transcoded and copied to the network storage 315 for delivery, facilitating access to media without necessarily requiring that the subscription system 320 is active (e.g., online) Optionally, the host server 310 facilitates subscriber access from the remote device 330 for browsing and playing media content from the PC (320) when online. Media is transcoded at the PC (320) for transfer where appropriate, whether transfer of the media is made to the network storage 315 or directly to the remote device 330 (via the host server 310).

In connection with various example embodiments, a music service is made available via the host server 310 and subscriber's media sources with a range of network storage options. Subscribers to music service will be able to select collections to persist within their existing disk quota (e.g., storage available at the network storage 315). The selected collections are transcoded on the subscriber's PC (320) and moved to the network storage 315. In some instances, the music service provides an amount of network storage that is used for audio collections. The amount of storage offered is configurable to include, for example, varied amounts of storage for different subscription levels such as 1 GB, 5 GB, 10 GB, 20 GB, 40 GB and 60 GB.

In some applications, the host server 310 and/or the subscription system 320 transcode media content in response to a file request for the content. For instance, a requested file can be transcoded to an MP3 stream at 56 kbps and delivered as a progressive download.

In other applications, media collections are pre-transcoded to the network storage 315. Subscribers are given the ability to select collections for automatic transcoding and transfer to the network storage 315. The content in each collection (e.g., music tracks) that has been selected and transcoded to the network storage is made available in one or more formats, such as a relatively low bit-rate format (e.g., 56 kbps for music) and a relatively higher bit-rate format (e.g., 196 kbps MP3 format).

In still other applications, the host server 310 and/or subscription system 320 transcode media in two or more formats for mobile playback. For instance, where specific audio playback devices are registered to a subscriber, media may be transcoded into alternative audio formats for each specific device and moved to the network storage 315.

In another example embodiment, a share such as an item from a music library asset space is presented to a remote user, such as the remote user 230 in FIG. 2, for access via a URL. The URL includes a security token and information detailing the item or items shared. When a remote user clicks on a share URL, a media player (e.g., a flash audio player) is displayed and used to play an appropriately transcoded version of the shared media. With this approach, media is made available to a remote user without necessarily allowing the remote user to download the requested media (i.e., the user instead accesses the media via the media player). For general information regarding data transfer, and for specific information regarding approaches to token-based media transfer that may be implemented in connection with one or more example embodiments of the present invention, reference may be made to U.S. patent application Ser. No. 11/374,414, referenced above.

In some applications, when a user receives URL (e.g., via email) and clicks on the link to access the media content via the user's PC, a default network browser is launched. A host server (e.g., host server 210) verifies that the browser is supported and responds with a page to download a media player (e.g., player 212). If appropriate software (e.g., flash) is not installed on the PC, a message is displayed to inform the user that appropriate software (e.g., a plug-in) needs to be installed.

When a media player launches successfully, a list of shared collections available via the URL to the user is displayed as a scrolling list in the upper advertising area. The list will include, for example, the name of the sender (i.e., a subscriber sharing media), a collection title for the shared media, and an expiration date for access to the media.

When one of the collections is clicked on, a media list is loaded into the media player and, in some applications, a first media item is started for playback. In some applications, as soon as a collection has been selected, an upper advertising area displays a subscription offer and/or an up-sell offer.

In some applications, a user is allowed to forward a collection to another user by clicking on a share button. As a guest user, a user is asked for his or her name, email address and approval for an opt-in email contact. This information is stored, for example, in a location accessible by a host server such as host server 110 as the sender of the share, but not as a complete account. The name, email and opt-in status is made accessible to the host server to allow subsequent messages to be sent to the sender. In some applications, caching directives for the media content limit the persistence of selected content to one day.

In some applications involving a guest user, a guest-mode Mini-Player is presented and includes a menu to provide access to several additional functions. Such functions may include one or more of the following:

Collections: the presented Mini-Player is operated to switch back to a list of received Shares in an advertising pane.

Respond: the presented Mini-Player is operated to launch a default email client with the address of the sender of a currently-selected collection. In some applications, this option is disabled if no collection has been selected.

Subscribe: the presented Mini-Player is operated to launch a new browser window to a corporate site for the host server communicating with (e.g., and providing) the Mini-Player.

More Info: the presented Mini-Player is operated to launch a new browser window to a Guest Player Help page.

Login/Logout: the presented Mini-Player is operated to selectively hide a menu.

Share: the presented Mini-Player is operated to present an alternate Share dialog that allows the user to specify an email address or phone number to which a Sharing Notification will be sent for a current Collection.

Storage: the presented Mini-Player is operated to hide a menu and limit storage to a current collection.

CD Quality: the presented Mini-Player is operated to hide a menu, with all audio content sent in a standard quality.

Subscribe: the presented Mini-Player is operated to display a dialog informing the user that an email will be sent to the user's registered address with details on how to subscribe, and optionally, a promotion code.

Exit: the presented Mini-Player is operated to terminate playback and close the application, with closing not necessarily interrupting playback of the current collection.

The various embodiments described above and shown in the figures are provided by way of illustration only and should not be construed to limit the invention. Based on the above discussion and illustrations, those skilled in the art will readily recognize that various modifications and changes may be made to the present invention without strictly following the exemplary embodiments and applications illustrated and described herein. For example, the functions carried out by host servers, media sources and hosted storage are selectively implemented together and/or in different arrangements, depending upon the application. Further, media sources (or home network arrangements/devices) are selectively implemented with mobile-type devices, such as mobile packet-based devices (e.g., mobile telephones, laptops or personal devices); data can be made available from such devices to other remote devices.

These approaches are implemented in connection with various example embodiments of the present invention. Such modifications and changes do not depart from the true spirit and scope of the present invention, including that set forth in the following claims.

What is claimed is:

1. A method, comprising:
at a host server, receiving a registration request to register media content for access by one or more remote users, and receiving media access criteria specifying access rights for the one or more remote users, wherein the media content and the media access criteria are received from a subscriber;
facilitating the registration of the media content at a subscriber's media source by, providing a media player for access by the subscriber, and receiving one or more subscriber media content share selections via the media player;
facilitating a provision of the media content at the subscriber's media source based, at least in part, on the one or more subscriber media content share selections;
transcoding the one or more subscriber media content share selections at the subscriber's media source based, at least in part, on a plurality of subscription levels associated with the one or more remote users, wherein the subscription levels specify different levels of metadata display, sorting abilities, or a combination thereof, associated with playback of the media content using the media player;
controlling, by the host server, the subscriber's media source to deliver the one or more subscriber media content share selections to a network cache, for the playback at a remote user's device based on a respective one of the subscription levels, and
controlling, by the host server, a removal of the one or more subscriber media content share selections from the network cache, after the playback at the remote user's device.

2. The method of claim 1, wherein the transcoding is further based on the capabilities of the remote user's device, a subscriber providing media for access, or available communications for delivering media to the remote user's device or a combination thereof,
wherein the subscriber's media source is located within a home network of the subscriber.

3. The method of claim 1, further comprising:
at the host server, receiving an access request for access to a share of the media content, and receiving authorization information associated with one of the one or more remote users, wherein the access request and the authorization information are received from the remote user's device;
authorizing the access request based, at least in part, on the authorization information and the media access criteria associated with the one remote user; and
facilitating a delivery of a user-interface to the remote user's device, wherein the user-interface controls access of the remote user's device to at least a portion of the share of media content based, at least in part, on the authorization or the subscription level associated with the one remote user.

4. The method of claim 1, wherein the media content stored on the subscriber's media source comprises one or more of a storage device controlled by the subscriber, a remote network storage device, and a storage device local to the host server, and
wherein the media content includes one or more media items belonging to the subscriber and one or more other media items belonging to a third party provider to which the subscriber is subscribed.

5. The method of claim 1, further comprising:
controlling, by the host server, a launching of the media player at the remote user's device with a user-interface displaying the one or more subscriber media content share selections as a scrolling list, wherein the list includes a name of the subscriber, titles of the one or more subscriber media content share selections, and an expiration date for access to the one or more subscriber media content share selections,
wherein the user-interface is provided by an application and the application comprises the media player provided to the remote user's device via a remote network site, and
wherein the subscription levels further specify different playback bitrates, data formats, or a combination thereof, of the media player.

6. The method of claim 1, wherein the user-interface is provided by an application and the application comprises the media player remotely downloaded at the remote user's device from the host server to operate offline.

7. The method of claim 1, further comprising:
transcoding the share of media content accessed by the remote user's device based, at least in part, on one or more of the media access criteria associated with the one remote subscriber, a subscription level associated with the subscriber, and capabilities of the remote user's device,
wherein the capabilities of the remote user's device include an access type that is a share creation, a remote share access, or a combination thereof.

8. The method of claim 1, further comprising:
providing a uniform resource locator (URL) to the remote user's device for accessing the share of media content, wherein the access request is received via an access of the URL by the remote user's device, wherein the URL includes a security token and information of the one or more subscriber media content share selections.

9. The method of claim 8, further comprising:
controlling, by the host server, the subscriber's media source to deliver the media content to a network cache, for the playback at the remote user's device based on the respective subscription level;
when the remote user's device providing the security token with authorization information to the host server, directing, by the host server, at least a portion of the media content from the network cache to the remote user's device based on the authorization information; and
controlling, by the host server, a removal of the media content from the network cache, after the playback at the remote user's device,
wherein the subscription levels further specify different storage amount limits of the media content at the network cache.

10. An apparatus comprising:
at least one processor; and
at least one memory including computer program code for one or more programs;
the at least one memory and the computer program code configured to, with the at least one processor, cause the apparatus to perform at least the following:
receiving a registration request to register media content for access by one or more remote users, and receive media access criteria specifying access rights for the one or more remote users, wherein the media content and the media access criteria are received from a subscriber;

facilitating the registration of the media content at a subscriber's media source by, providing a media player for access by the subscriber, and
    receiving one or more subscriber media content share selections via the media player;
facilitating a provision of the media content at the subscriber's media source based, at least in part, on the one or more subscriber media content share selections;
transcoding the one or more subscriber media content share selections at the subscriber's media source based, at least in part, on a plurality of subscription levels associated with the one or more remote users, wherein the subscription levels specify different levels of metadata display, sorting abilities, or a combination thereof, associated with playback of the media content using the media player;
controlling the subscriber's media source to deliver the one or more subscriber media content share selections to a network cache, for the playback at a remote user's device based on a respective one of the subscription levels; and
controlling a removal of the one or more subscriber media content share selections from the network cache, after the playback at the remote user's device.

11. The apparatus of claim 10, wherein the transcoding is further based on the capabilities of the remote user's device, a subscriber providing media for access, or available communications for delivering media to the remote user's device or a combination thereof.

12. The apparatus of claim 10, wherein the subscription levels further specify different storage amount limits of the media content at the network cache.

13. The apparatus of claim 10, further configured to perform at least the following:
    receiving at the apparatus, an access request for access to a share of the media content, and receive authorization information associated with one of the one or more remote users, wherein the access request and the authorization information are received from the remote user's device;
    authorizing the access request based, at least in part, on the authorization information and the media access criteria associated with the one remote user; and
    facilitating a delivery of a user-interface to the remote user's device, wherein the user-interface controls access of the remote user's device to at least a portion of the share of media content based, at least in part, on the authorization or the subscription level associated with the one remote user.

14. The apparatus of claim 10, wherein the media content stored on the subscriber's media source comprises one or more of a storage device controlled by the subscriber, a remote network storage device, and a storage device local to the apparatus.

15. The apparatus of claim 10, wherein the user-interface is provided by an application and the application comprises the media player provided to the remote user's device via a remote network site, and
    wherein the subscription levels further specify different playback bitrates, data formats, or a combination thereof, of the media player.

16. The apparatus of claim 10, wherein the user-interface is provided by an application and the application comprises the media player remotely downloaded at the remote user's device from the apparatus to operate offline.

17. The apparatus of claim 10, further configured to perform at least the following:
    transcoding the share of media content accessed by the remote user's device based, at least in part, on one or more of the media access criteria associated with the one remote subscriber, a subscription level associated with the subscriber, and capabilities of the remote user's device,
    wherein the capabilities of the remote user's device include an access type that is a share creation, a remote share access, or a combination thereof.

18. The apparatus of claim 10, further configured to perform at least the following:
    providing a uniform resource locator (URL) to the remote user's device for accessing the share of media content, wherein the access request is received via an access of the URL by the remote user's device.

* * * * *